US008868526B2

(12) United States Patent
Balakrishnan et al.

(10) Patent No.: US 8,868,526 B2
(45) Date of Patent: Oct. 21, 2014

(54) PARALLEL SEGMENTED INDEX SUPPORTING INCREMENTAL DOCUMENT AND TERM INDEXING

(75) Inventors: Sreeram V. Balakrishnan, Los Altos, CA (US); Michael Busch, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 957 days.

(21) Appl. No.: 12/475,300

(22) Filed: May 29, 2009

(65) Prior Publication Data

US 2010/0306238 A1   Dec. 2, 2010

(51) Int. Cl.
*G06F 17/30* (2006.01)

(52) U.S. Cl.
CPC ................ *G06F 17/30631* (2013.01)
USPC .......................... 707/696; 707/711

(58) Field of Classification Search
None
See application file for complete search history.

(56) References Cited

U.S. PATENT DOCUMENTS

| 5,685,003 | A  | * | 11/1997 | Peltonen et al. ............... 715/202 |
| 6,049,804 | A  |   | 4/2000  | Burgess et al. |
| 2002/0093522 | A1 | * | 7/2002 | Koskas ........................ 345/700 |
| 2004/0098359 | A1 | * | 5/2004 | Bayliss et al. ................... 707/1 |
| 2007/0118873 | A1 |   | 5/2007 | Houh et al. |
| 2009/0037440 | A1 | * | 2/2009 | Will et al. ....................... 707/100 |
| 2009/0055417 | A1 |   | 2/2009 | Hannuksela |
| 2009/0144279 | A1 | * | 6/2009 | Moe ................................. 707/6 |
| 2009/0299705 | A1 | * | 12/2009 | Chi et al. ......................... 703/2 |
| 2010/0100543 | A1 | * | 4/2010 | Brady ........................... 707/732 |
| 2010/0174670 | A1 | * | 7/2010 | Malik et al. ..................... 706/12 |
| 2010/0278268 | A1 | * | 11/2010 | Lee et al. ................. 375/240.16 |
| 2011/0219008 | A1 |   | 9/2011 | Been et al. |

FOREIGN PATENT DOCUMENTS

WO          01-27793 A1     4/2001

OTHER PUBLICATIONS

Justin Zobel and Alistair Moffat, Inverted Files for Text Search Engines, ACM Computing Surveys, vol. 38, No. 2, Article 6, Publication date: Jul. 2006, pp. 1-56, Association for Computing Machinery, New York, NY.
Welcome to Lucene!, Copyright 2009, The Apache Software Foundation, <<http://lucene.apache.org>>.

* cited by examiner

*Primary Examiner* — Son T Hoang
(74) *Attorney, Agent, or Firm* — Patterson & Sheridan, LLP (57) ABSTRACT

Documents and search terms may be received for which an index that supports both incremental document indexing and incremental term indexing is to be generated. From this information, an index may be generated, partitioned in a first dimension by documents to create master segments and in a second dimension by search terms to create slave segments. A request to update the index to include a new document or a new search term may be received. The new document or new search term may be added to the index without modifying the entire index. Further, document identifiers may be synchronized across all segments. Synchronization refers to maintaining consistency of document identifiers across segments, despite renumbering of document identifiers during certain operations such as merging segments.

24 Claims, 10 Drawing Sheets

PARALLEL SEGMENTED INDEX SUPPORTING INCREMENTAL DOCUMENT AND TERM INDEXING

BACKGROUND OF THE INVENTION

1. Field of the Invention

Embodiments of the invention relate to search indexing. More specifically, embodiments of the invention relate to a parallel segmented index that supports both incremental document indexing and incremental term indexing.

2. Description of the Related Art

A search engine may use a search index to identify and return documents responsive to a search query, which may include one or more search terms. The search index (or simply index) may be generated over an entire corpus of documents and may improve the efficiency with which relevant documents (i.e. of the corpus) are identified for a search query. For example, the search index may provide a mapping from indexed terms to each document that includes a given term. In one embodiment, the search index may also provide a mapping from a document to terms included in that document. If a document is added to the corpus, the index may need to be modified to accommodate the new document. Modifying a large index may be costly in terms of computation time and resources.

However, a search index may be designed to support incrementally indexing a document (i.e., without modifying the entire search index). For example, a search index may be divided into one or more segments. Each segment may index a subset of the corpus. Thus, the search index may add a new segment to include a new document without modifying other (existing) segments. By limiting the size of a segment, the search index may include new documents at an improved rate.

SUMMARY OF THE INVENTION

One embodiment of the invention includes a computer-implemented method for generating an index that supports incremental document indexing and incremental term indexing, the method including configuring one or more processors to perform an operation. The operation may generally include receiving an index to the plurality of documents and with respect to a plurality of terms, wherein the index is partitioned in a first dimension by documents to create a first master segment; receiving a first term not part of the plurality of terms; and generating a first slave segment storing an index to the plurality of documents with respect to at least the first term, wherein the slave segment is associated with the first master segment.

Another embodiment of the invention includes a computer program product, the computer program product including a computer usable storage medium having computer usable program code for generating an index that supports incremental document indexing and incremental term indexing, the code being configured for receiving an index to the plurality of documents and with respect to a plurality of terms, wherein the index is partitioned in a first dimension by documents to create a first master segment; receiving a first term not part of the plurality of terms; and generating a first slave segment storing an index to the plurality of documents with respect to at least the first term, wherein the slave segment is associated with the first master segment.

Still another embodiment of the invention includes a system having a computer processor and a memory containing an application program configured to generate an index that supports incremental document indexing and incremental term indexing, which, when executed on the computer processor is configured to perform an operation. The operation may generally include receiving an index to the plurality of documents and with respect to a plurality of terms, wherein the index is partitioned in a first dimension by documents to create a first master segment; receiving a first term not part of the plurality of terms; and generating a first slave segment storing an index to the plurality of documents with respect to at least the first term, wherein the slave segment is associated with the first master segment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In one embodiment of the present invention, a user may wish to specify a search term to be added an existing search index. That is, documents previously indexed had not been indexed with respect to the specified search term. In this case, the search index may need to be modified to include the specified search term. However, modifying the search index may involve reprocessing the entire corpus of documents. Thus, adding a search term to an existing search index may be costly in terms of computation time and resources.

Search terms may be added to an existing search index for a variety of reasons. For example, a search index may have been created for emails stored on an email server according to a term dictionary. The term dictionary may include terms by which the emails may be indexed. Subsequent to creation of the search index, a user may desire to update the term dictionary to include one or more new search terms. In this case, the emails are to be re-indexed using the updated term dictionary (i.e., that includes the one or more new search terms).

As another example, a search index may support search terms specific to one or more fields. Each field specifies a particular portion of a document to be searched. For example, a search index may have been created for emails stored on an email server. A user who desires to search for emails containing a search term "proposal" may initiate a search, specifying the search term "proposal" for the field "email body". Other examples of fields include "email subject," "email attachment contents," "email attachment author," etc. For example, subsequent to the search index being created for the emails, a user may desire to index one or more terms for a new field (i.e., a field not included in the search index, e.g., "email subject" or "email attachment author"). For instance, the user may desire to update the index to support one or more search terms for an "email attachment contents" field, rather than merely the "email body" field.

Embodiments of the present invention generally create an index that supports both incremental document indexing and incremental term indexing. One embodiment of the invention provides a parallel indexer. The parallel indexer may generate an index that supports both incremental document indexing and incremental term indexing. The generated index may be partitioned in a first dimension by documents (to create master segments) and in a second dimension by search terms (to create slave segments). In other words, slave segments may be created in parallel to master segments of the search index. Responsive to a request to include a new search term, the generated index may include the new search term without modifying any master segment. Further, responsive to a request to include a new document, the generated index may include the new document without modifying any slave segment. Thus, both new documents and new search terms may be added incrementally to the search index, without degrading performance of either document ingest rate (i.e., indexing performance) or query response time (i.e., search performance).

In one embodiment, when new documents are ingested into the search index, the parallel indexer may use a buffer to efficiently create new slave segments. Further, the parallel indexer may support deleting documents and/or search terms from the search index. The parallel indexer may also support merging segments across either dimension (i.e., by documents or by search terms). The merging may also be synchronized. Synchronization refers to maintaining consistency of document identifiers across segments (i.e., in both dimensions) even while document identifiers are renumbered (e.g., due to removal of documents from the search index). Document identifiers are commonly known as "doc IDs" and often represented as integers or long numbers.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
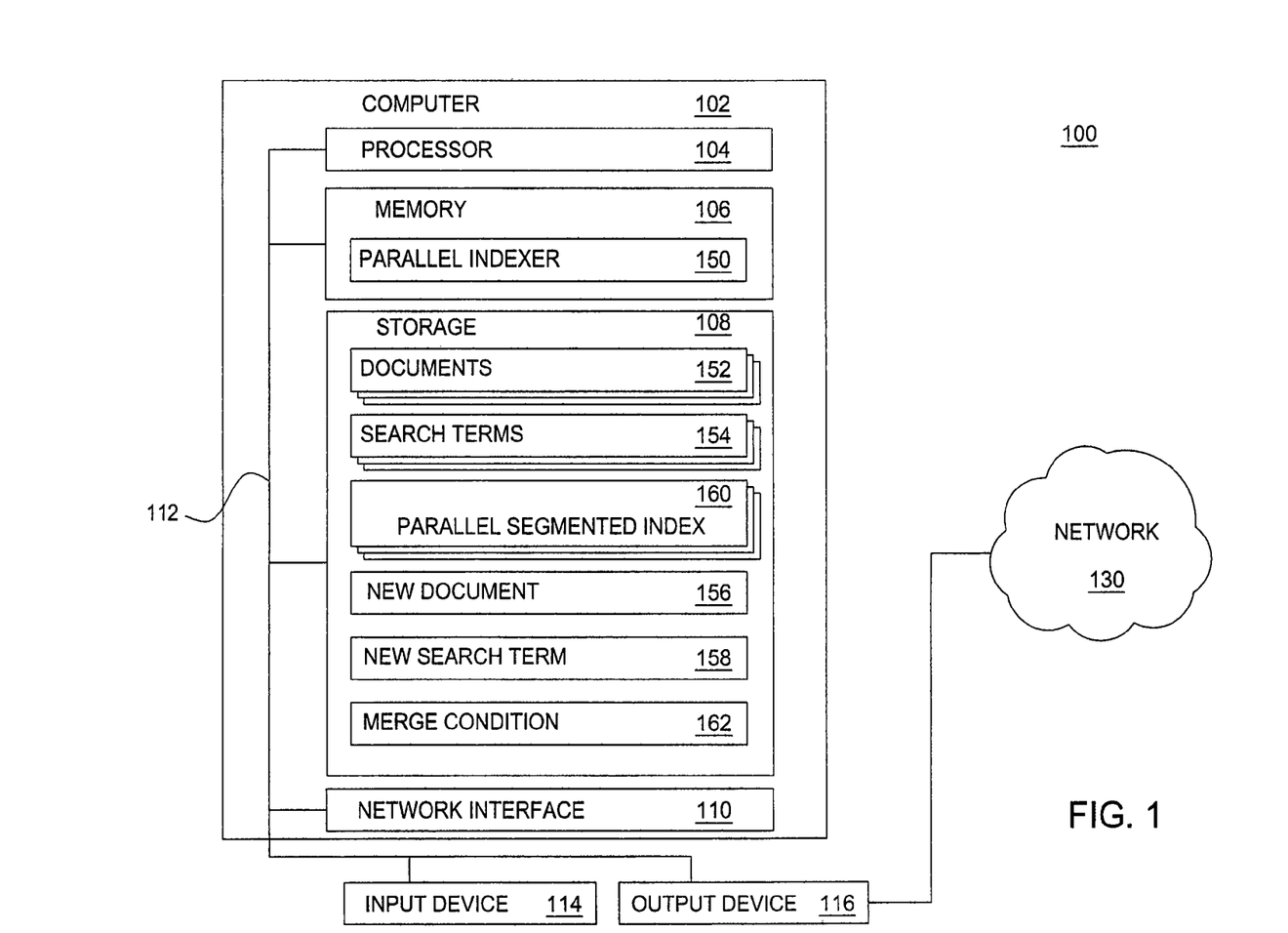
FIG. 1 is a block diagram illustrating a system for generating a parallel segmented index, according to one embodiment of the invention.

FIG. 1 is a block diagram illustrating a system 100 for generating a parallel segmented index, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a parallel indexer 150. Further, the storage 108 of the computer 102 includes documents 152, search terms 154, a parallel segmented index 160, a new document 156, a new search term 158, and a merge condition 162. FIGS. 2A through 6 and associated descriptions detail the structure and operation of the parallel indexer 150 running on the computer 102.

Figure 2A:
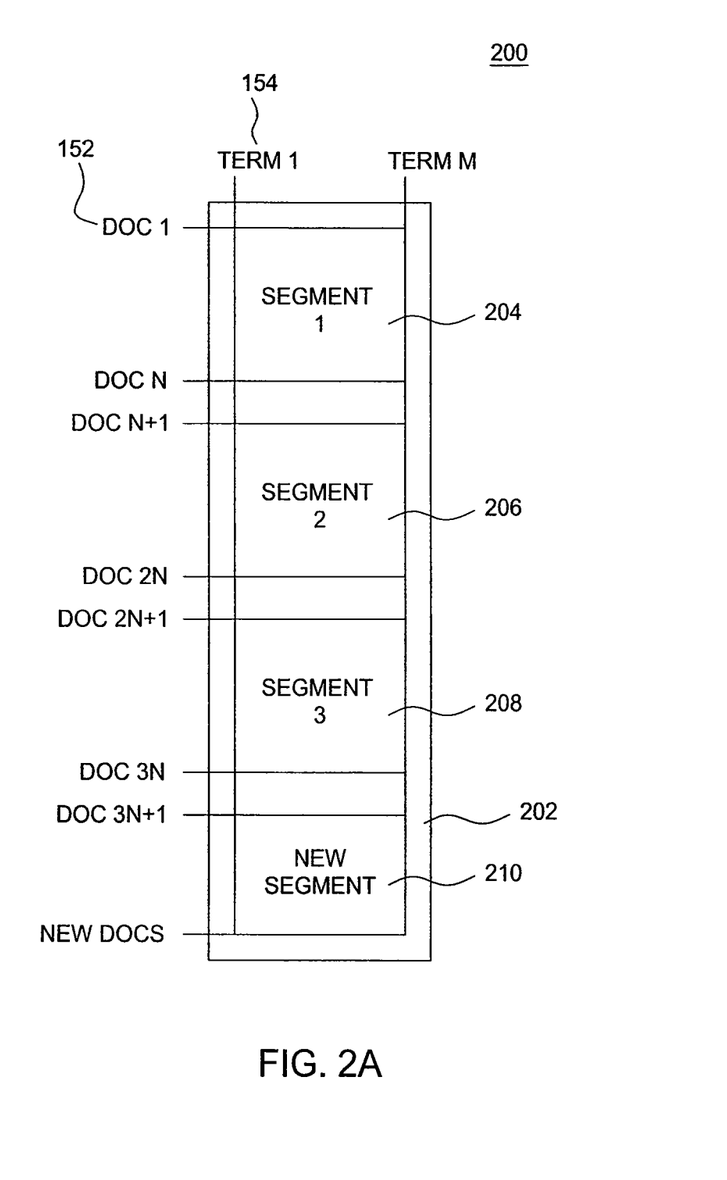
FIG. 2A is a block diagram illustrating an index partitioned in a first dimension by documents, according to one embodiment of the invention.

FIG. 2A is a block diagram 200 illustrating an index 202 partitioned in a first dimension by documents 152, according to one embodiment of the invention. As shown, the index 202 includes segments 204, 206, 208, 210. Each segment 204, 206, 208, 210 indexes a subset of the documents 152, with respect to search terms 154. Further, an application (e.g., a search engine) may access the index via an index reader interface that transparently combines results from the segments 204, 206, 208, 210 so as to make the index appear as a single segment to the application. An index 202 partitioned in this manner may ingest a new document 152 into a new segment 210 without modifying other segments 204, 206, 208. Further, each segment 204, 206, 208, 210 may reference document identifiers in an unbroken sequence. Further still, the sequential nature of the document identifiers may be preserved when segments are merged. For example, document identifiers may be reordered due to deleted documents. Referencing document identifiers in an unbroken sequence may improve the performance characteristics of the search index 202. In one embodiment, a size of each segment may also be predefined and/or specified by a user. A smaller segment size may result in a faster rate of ingesting new documents 152.

In one embodiment, a user may specify policies affecting performance of the search index 202. The policies may include a first policy for creating a new segment and a second policy for merging segments. Each policy may specify one or more merge conditions 162. For example, the policy for creating a new segment may include a maximum size for a current segment 210. Upon determining that the maximum size has been reached, the parallel indexer 150 may: (i) close the current segment 210; (ii) commit the current segment 210 to storage; and (iii) create a new segment.

In specifying the policy for merging segments, a user may balance a tradeoff between indexing performance (i.e., minimizing the size of segments) and searching performance (i.e., minimizing the number of segments). For example, a user may specify to merge K segments of N documents into a single segment for K*N documents. N specifies a document limit for a segment, while K specifies a merge factor, according to one embodiment. Under this policy, the maximum number of segments may be proportional to log base K of the number of documents.

Figure 2B:
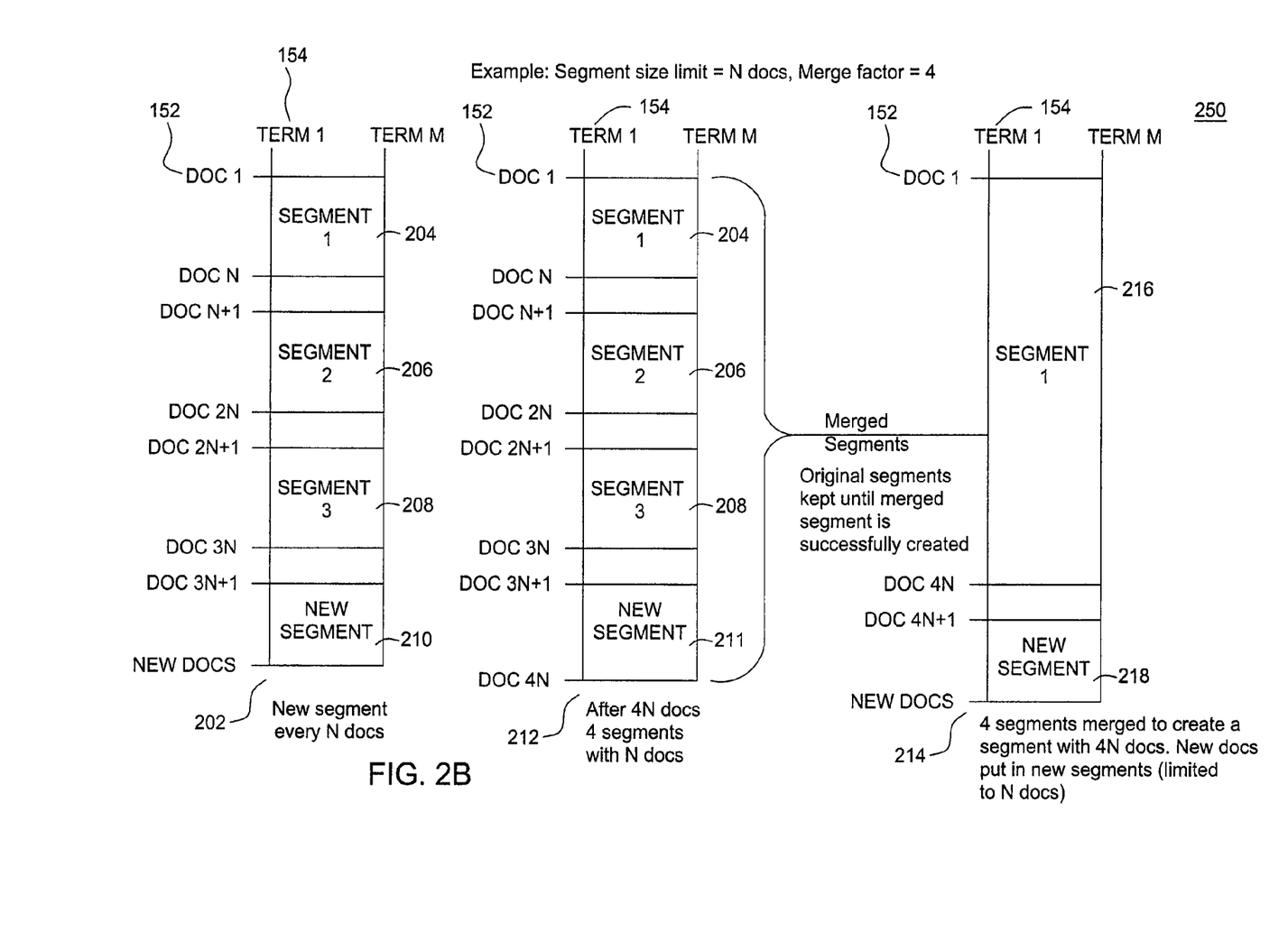
FIG. 2B is a block diagram that illustrates merging of an index, according to one embodiment of the invention.

FIG. 2B is a block diagram 250 that illustrates merging segments 204, 206, 208, 210 of the search index 202 of FIG. 1, according to one embodiment of the invention. Suppose that the policy is to merge four segments of N documents into a single segment of 4*N documents (i.e., K=4). In other words, the size limit for segments is N and the merge factor is four in this particular example. As shown, the parallel indexer 150 may create a new segment 210 for the index 202 for every N documents ingested into the index 210. Upon determining that a limit (i.e., according to the policy) of four segments each with N documents has been reached (e.g., as shown in index 212), the parallel indexer 150 may merge the four segments 204, 206, 208, 211 of N documents into a single segment of 4*N documents to create the index 214. As shown, the created index 214 includes the merged segment 216 (i.e., from the segments 204, 206, 208, 211). Further, the created index 214 includes a new segment 218. The parallel indexer 150 may ingest new documents (i.e., documents numbered 4N+1 through 5N) into the new segment 218.

Figure 3A:
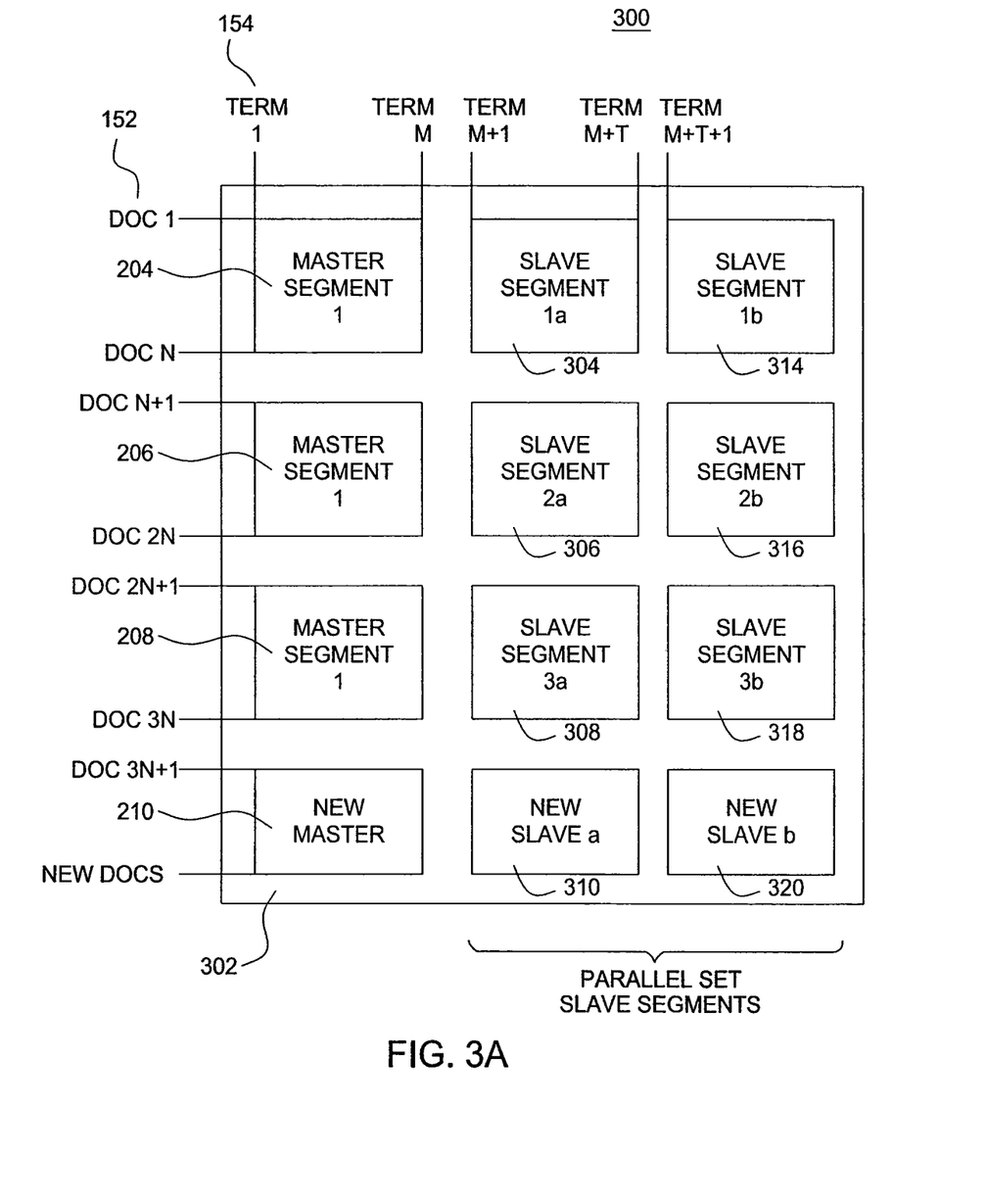
FIG. 3A is a block diagram illustrating an index partitioned in a first dimension by documents and in a second dimension by search terms, according to one embodiment of the invention.

FIG. 3A is a block diagram 300 illustrating an index 302 partitioned in a first dimension by documents 152 and in a second dimension by search terms 154, according to one embodiment of the invention. As shown, the index 302 is partitioned in a first dimension by documents 152 to create segments 204, 206, 208, 210. The segments of the first dimension may be referred to as master segments. Further, the index 302 may also be partitioned in a second dimension by search terms 154 to create a set of segments 304, 306, 308, 310. The segments of the second dimension may be referred to as slave segments. The slave segments include indexes for new search terms 154. In one embodiment, the set of slave segments 304, 306, 308, 310 mirrors the structure of the master segments 204, 206, 208, 210. For example, the slave segments 304, 306, 308, 310 partition documents and reference document identifiers in a manner consistent with the master segments 204, 206, 208, 210.

Suppose that the master segments 204, 206, 208, 210 index documents 152 with respect to M search terms. That is, M refers to the number of search terms supported by the search index 302 when the search index 302 was originally generated before any new search terms 154 were added to the search index 302. The parallel indexer 150 may add a new search term M+1 to the index 302 without having to modify the master segments 204, 206, 208, 210. For example, a user may desire to update the search index 302 to support one or more new search terms (e.g., that are added to an existing term dictionary, or that are associated with a new field to be supported by the search index 302). Specifically, when a new search term 154 is added (i.e., term M+1) the parallel indexer 150 creates a slave segment for each existing master segment. Each slave segment includes an index of documents in a corresponding master segment, but only with respect to a term being added to the search index. Thus, only the slave segments 304, 306, 308, 310 are modified in this example, leaving the corresponding master segments 204, 206, 208, and 210 unmodified.

Further, in one embodiment, the user may specify a term limit T for a segment. The term limit specifies a maximum number of search terms 154 indexed by a slave segment. For example, upon determining that the slave segments 304, 306, 308, 310 index T search terms (specifically, search terms numbered M+1 through M+T, as shown in the index 302), the parallel indexer 150 may generate a new set of slave segments 314, 316, 318, 320. The new set of slave segments 314, 315, 318, 320 also mirrors the structure of the master segments 204, 206, 208, 210, according to one embodiment.

In one embodiment, the parallel indexer 150 may receive a query against a segment (such as a master segment or a slave segment). The parallel indexer 150 may execute the received query against the segment to generate results responsive to the query. The parallel indexer 150 may generate one or more new slave segments to store the results. In one embodiment, the one or more new slave segments may occupy the second dimension (by search terms) of the index 302. In another embodiment, the one or more new slave segments may occupy yet a third dimension of the index 302.

Figure 3B:
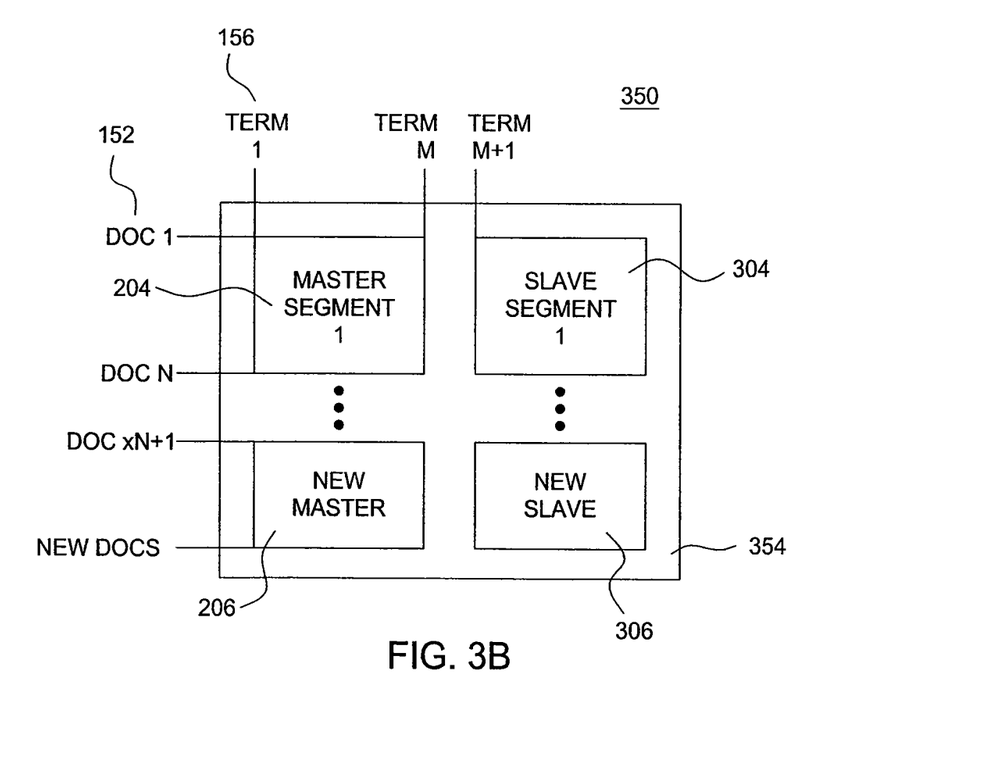
FIG. 3B is a block diagram that illustrates incrementally indexing a new document into a parallel segmented index, according to one embodiment of the invention.

FIG. 3B is a block diagram 350 that illustrates incrementally indexing a new document 152 into a search index 352, according to one embodiment of the invention. As shown, the search index 352 includes a master segment 204 and a slave segment 304. Suppose that the document limit is N in this example. Suppose further that a new document 152, numbered N+1, is ingested into the search index 352. In this case, the parallel indexer 150 may create a new master segment 206 for the new document 152. Specifically, the new master segment 206 may index the new document 152 with respect to search terms numbered 1 through M. To improve performance, the new master segment 206 may reside in a high speed buffer. In one embodiment, a maximum buffer size may be specified, such that only new master segments 206 not exceeding the specified buffer size may reside in the buffer. While the search index is described herein with reference to ingesting a new document 152, those skilled in the art will recognize that the search index may ingest multiple new documents using the techniques disclosed herein.

Further, as shown in the search index 354, the parallel indexer 150 may also create a corresponding new slave segment 306. Specifically, the new slave segment 306 may index the new document 152 with respect to search terms numbered M+1 through M+T (new search terms, i.e., search terms 154 added after the search index 302 was originally generated). In one embodiment, upon determining that the new master segment 206 has exceeded the maximum buffer size, the parallel indexer 150 may: (i) query the documents 152 for the new search terms using the high-speed buffer to create the new slave segment 306 and (ii) commit the new master segment 206 and the new slave segment 306 to storage 108. In another embodiment, both the new master segment 206 and the new slave segment 306 may be created in parallel in a high-speed buffer. In this case, the parallel indexer 150 may execute queries for the new search terms 154 against new documents 152, as the new documents 152 are ingested into the search index 354. Upon determining that the high-speed buffer is filled, the parallel indexer 150 may commit both the new master segment 206 and the new slave segment 306 to storage 108.

Figure 3C:
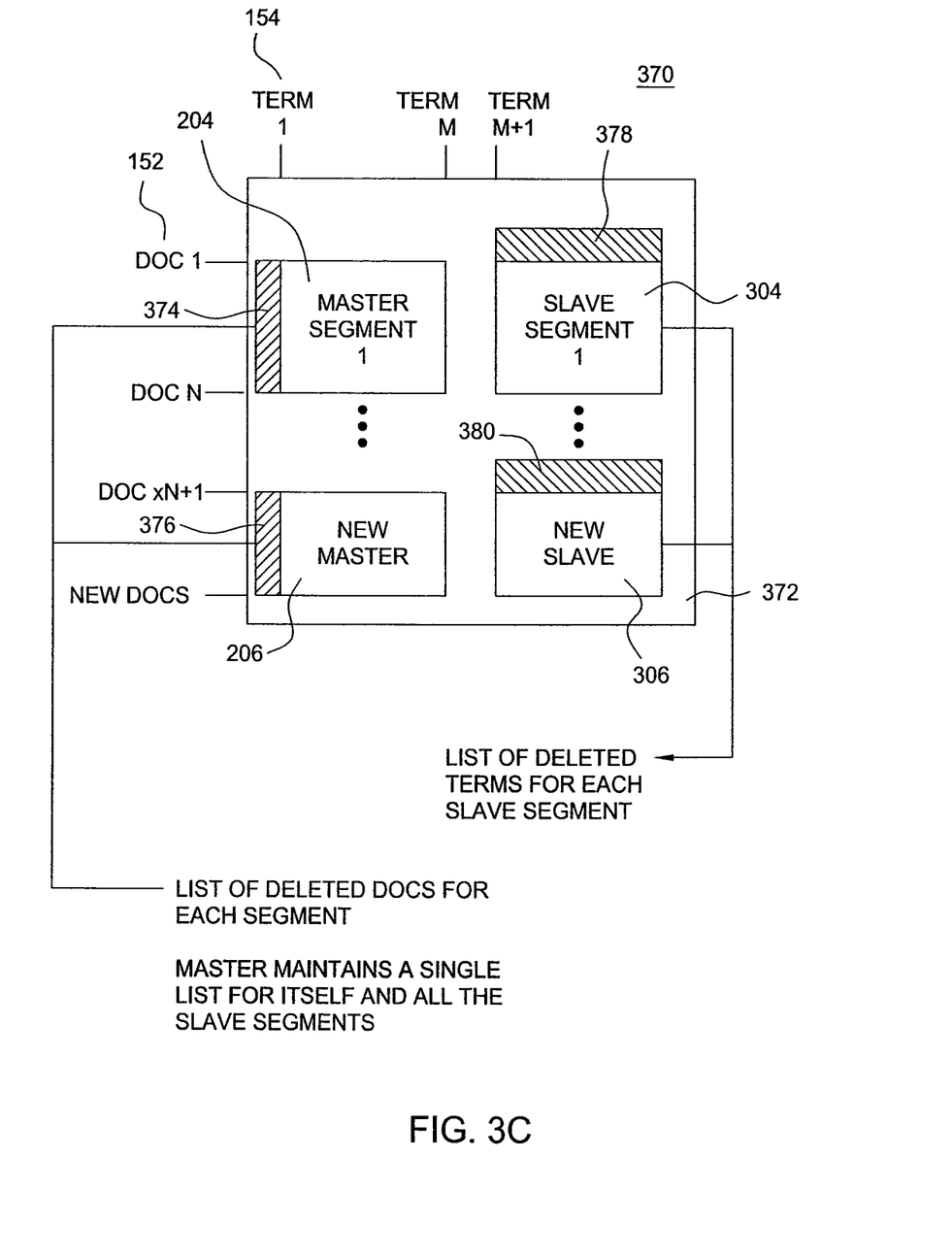
FIG. 3C is a block diagram that illustrates deleting a document or a search term from a parallel segmented index, according to one embodiment of the invention.

FIG. 3C is a block diagram 370 that illustrates deleting a document 152 or a search term 154 from a search index 372, according to one embodiment of the invention. As shown, the search index 372 includes master segments 204, 206 and slave segments 304, 306. Further, each master segment 204, 206 includes a list of deleted documents for the respective master segment 204, 206 and corresponding slave segments 304, 306. Further, each slave segment 304, 306 includes a list of deleted search terms.

In one embodiment, when a user specifies to delete a document 152 or a search term 154, the parallel indexer 150 marks the specified document 152 or search term 154 for subsequent deletion. For example, the parallel indexer 150 may add a specified document 152 to the list of deleted documents 374, 376. Similarly, the parallel indexer 150 may add a specified search term 154 to the list of deleted search terms 378, 380. In one embodiment, a specified document (or search term 154) is deleted from the index 372 only during a subsequent merge of the segments 374, 376, 378, 380. Specifically, when merging segments, the parallel indexer 150 may delete documents 152 and/or search terms 154 from the index 372 according to the lists 374, 376, 378, 380 and prior to creating a new merged segment. Further, prior to deletion of a specified document or search term 154 from the index 372, results for any query may be checked against the lists 374, 376, 378, 380 to exclude documents 152 and terms 154 marked for deletion. Further still, document identifiers referenced by the segments 374, 376, 378, 380 may be reordered to remove references to deleted documents. Thus, the sequential nature of the document identifiers may be preserved, which may result in improved performance of the search index 372 (e.g., by facilitate chunking and by reducing a number of page faults generated by operations on the search index 372).

Figure 3D:
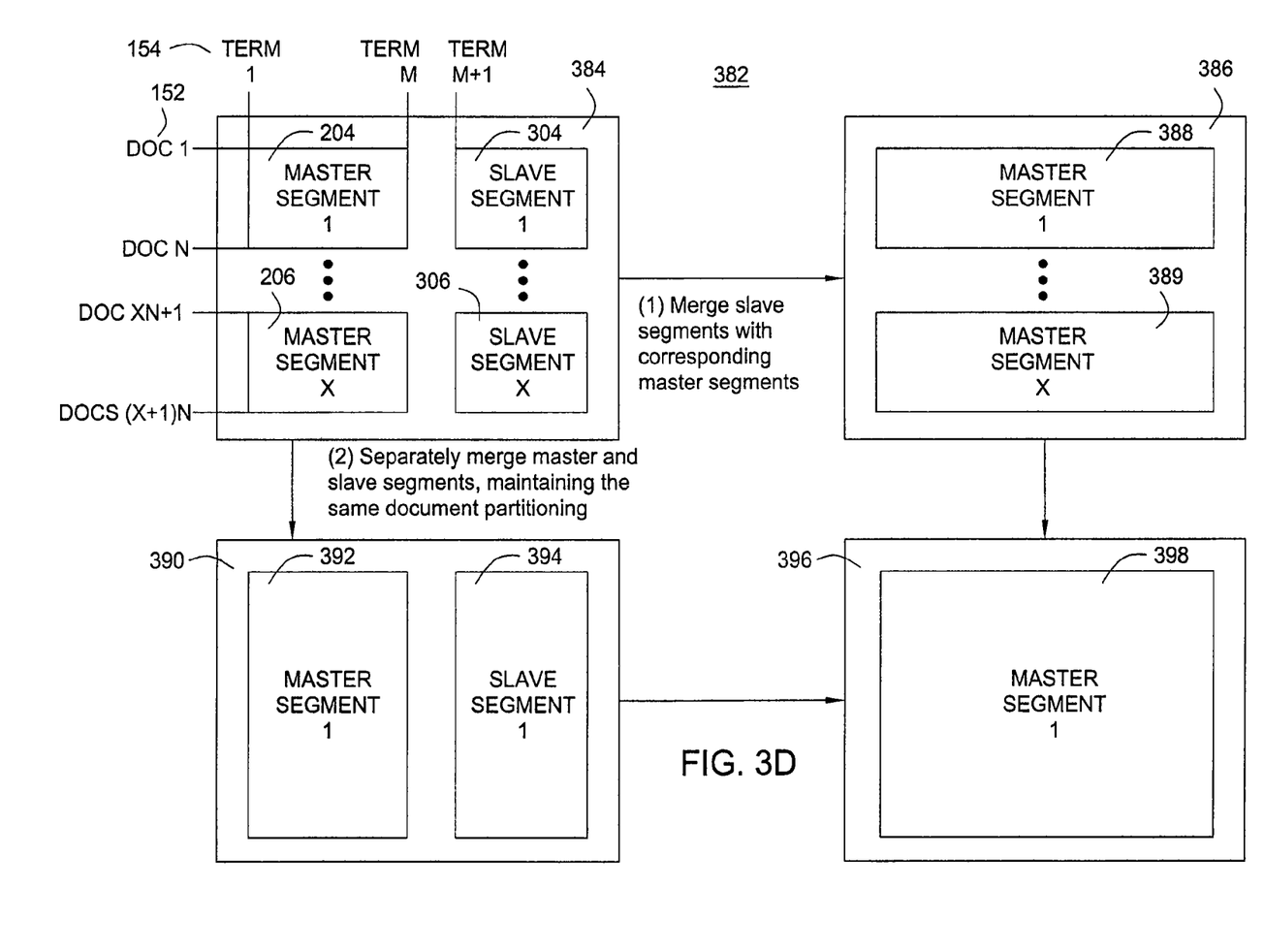
FIG. 3D is a block diagram that illustrates merging segments of a parallel segmented index, according to one embodiment of the invention.

FIG. 3D is a block diagram 382 that illustrates merging segments of a search index 384, according to one embodiment of the invention. As shown, the search index 384 includes master segments 204, 206 and slave segments 304, 306. In one embodiment, the segments 204, 206, 304, 306 may be merged in two directions (i.e., each direction corresponding to a dimension). For example, the segments 204, 206, 304, 306 may be merged across documents 152 and/or across search terms 154. In one embodiment, an application that uses the search index 384 may specify a desired type of merging to be performed, based on the characteristics and/or needs of the application (e.g., indexing performance versus searching performance, frequency of new terms/documents being added, etc.).

While the following examples of merging segments are described with reference to two master segments 204, 206 and two slave segments 304, 306, those skilled in the art will recognize that embodiments of the invention may support any number of master segments and/or slave segments.

To merge segments 204, 206, 304, 306 across documents 152, the parallel indexer 150 may: (i) merge master segments 204, 206 to create a merged master segment 392 (as shown in search index 390) and (ii) merge slave segments 304, 306 to create a merged slave segment 394. Both the merged master segment 392 and the merged slave segment 394 partition documents and reference document identifiers in a manner consistent with the segments 204, 206, 304, 306, according to one embodiment. If multiple sets of slave segments are present, a merged slave segment may be created from each set of slave segments. Further, the parallel indexer 150 may also subsequently merge the master segment 392 and the slave segment 394 to create a new master segment 398 (as shown in search index 396).

To merge segments 204, 206, 304, 306 across search terms 154, the parallel indexer 150 may merge each master segment 204, 206 with associated slave segments 304, 306. For example, the parallel indexer 150 may: (i) merge the master segment 204 and the slave segment 304 to produce a first master segment 388 (as shown in the search index 386) and (ii) merge the master segment 206 and the slave segment 306 to produce a second master segment 389. Both the first master segment 388 and the second master segment 389 partition documents and reference document identifiers in a manner consistent with the segments 204, 206, 304, 306, according to one embodiment. Further, the parallel indexer 150 may also subsequently merge the first master segment 388 and the second master segment 389 to create a new master segment 398 of the search index 396.

Figure 4:
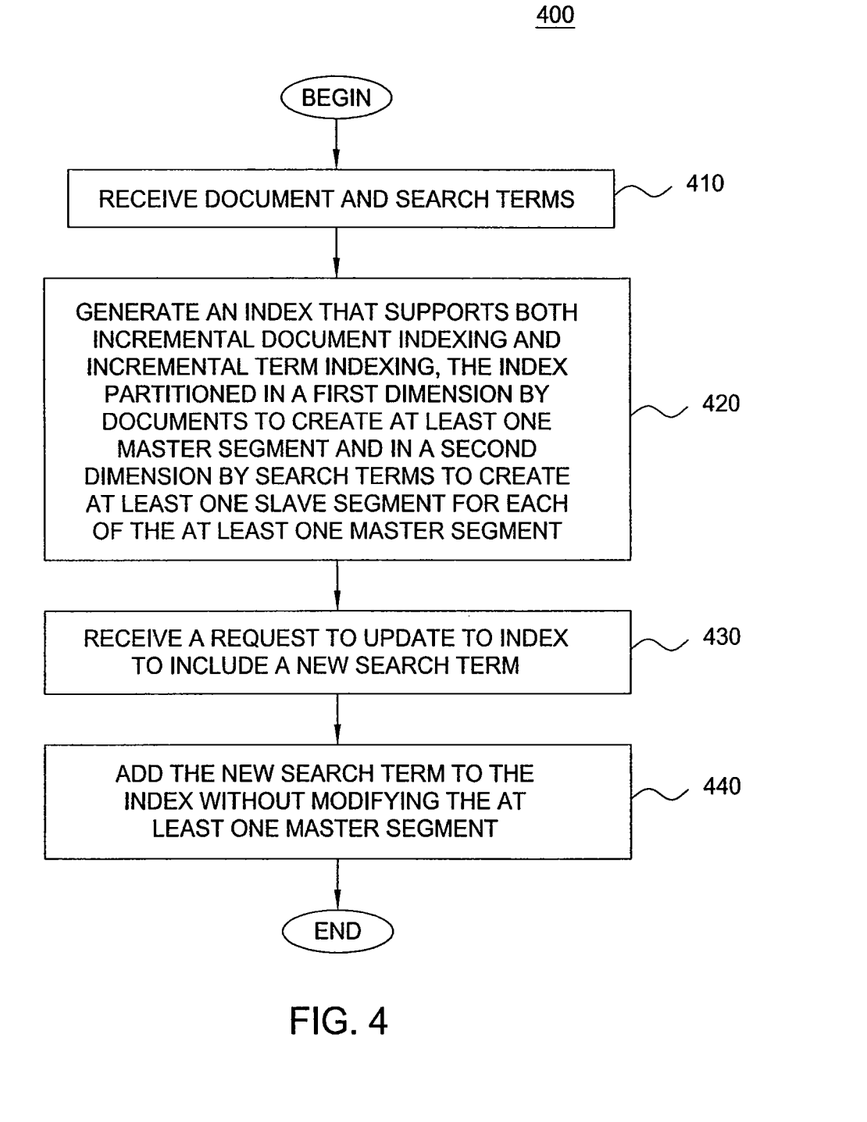
FIG. 4 is a flowchart depicting a method for generating a parallel segmented index, according to one embodiment of the invention.

FIG. 4 is a flowchart depicting a method 400 for generating an index 160 that supports both incremental document indexing and incremental term indexing, according to one embodiment of the invention. The method 400 may be performed by the parallel indexer 150 of FIG. 1. As shown, the method 400 begins at step 410, where the parallel indexer 150 receives documents 152 and search terms 154. For example, a user may specify for an index for N documents to be created with respect to M search terms. At step 420, the parallel indexer 150 generates an index 160 that supports both incremental document indexing and incremental term indexing. The index 160 may be partitioned in a first dimension by documents to create at least one master segment and in a second dimension by search terms to create at least one slave segment for each of the at least one master segment. For example, the index 302 of FIG. 3A illustrates a generated index 160.

At step 430, the parallel indexer 150 may receive a request to update the index 160 to include a new search term 154. At step 440, the parallel indexer 150 may add the new search term to the index without modifying the at least one master segment, responsive to the request. For example, slave segments 314, 316, 318, 320 may be modified to include occurrences of the new search term in the documents, without modifying the master segments 204, 206, 208, 210. After step 440, the method 400 terminates. In performing the method 400, the parallel indexer 150 preserves sequential ordering of document identifiers referenced by each segment. Further still, the parallel indexer ensures that document identifiers are synchronized across all segments.

Figure 5:
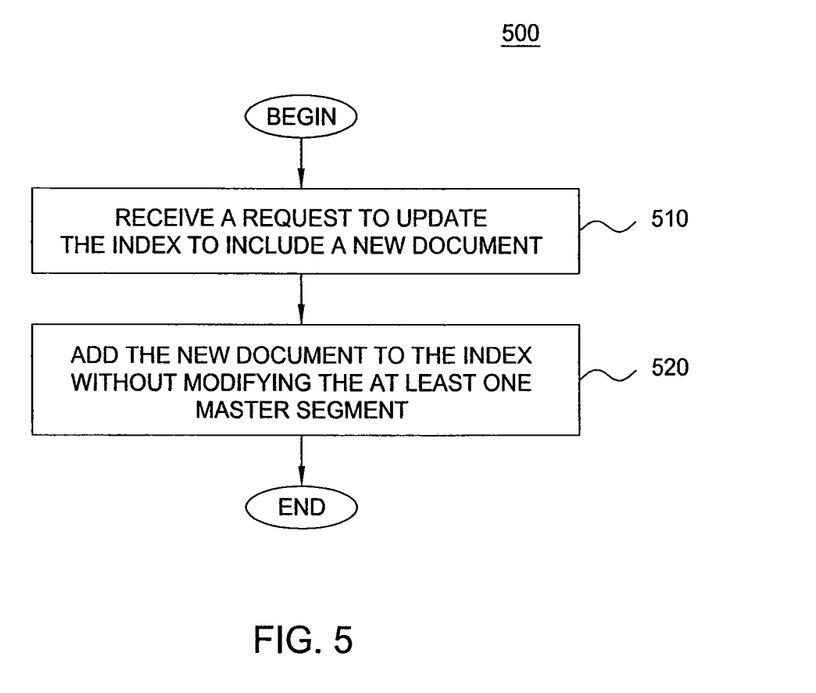
FIG. 5 is a flowchart depicting a method for incrementally indexing a new document into a parallel segmented index, according to one embodiment of the invention.

FIG. 5 is a flowchart depicting a method 500 for incrementally indexing a new document into the search index 160 of FIG. 1, according to one embodiment of the invention. The method 500 may be performed by the parallel indexer 150 of FIG. 1. As shown, the method 500 begins at step 510, where the parallel indexer 150 receives a request to update the index 160 to include a new document 152. At step 520, the parallel indexer 150 adds the new document 152 to the currently open master segment, i.e., a master segment which has not reached the size limit, been closed, an committed to storage. In other words, only a single master segments (and any associated slave segments) is "active" for ingesting new documents. As noted, new documents are added with a document identifier to preserve the sequence ordering of the index. For example, the new master segment 210 of FIG. 3A may be modified (along with associated slave segments 310, 320) to include the new document, without modifying the master segments 204, 206, 208, 210 (or associated slave segments 304, 306, 308, 314, 316, 318). After step 520, the method 500 terminates.

Figure 6:
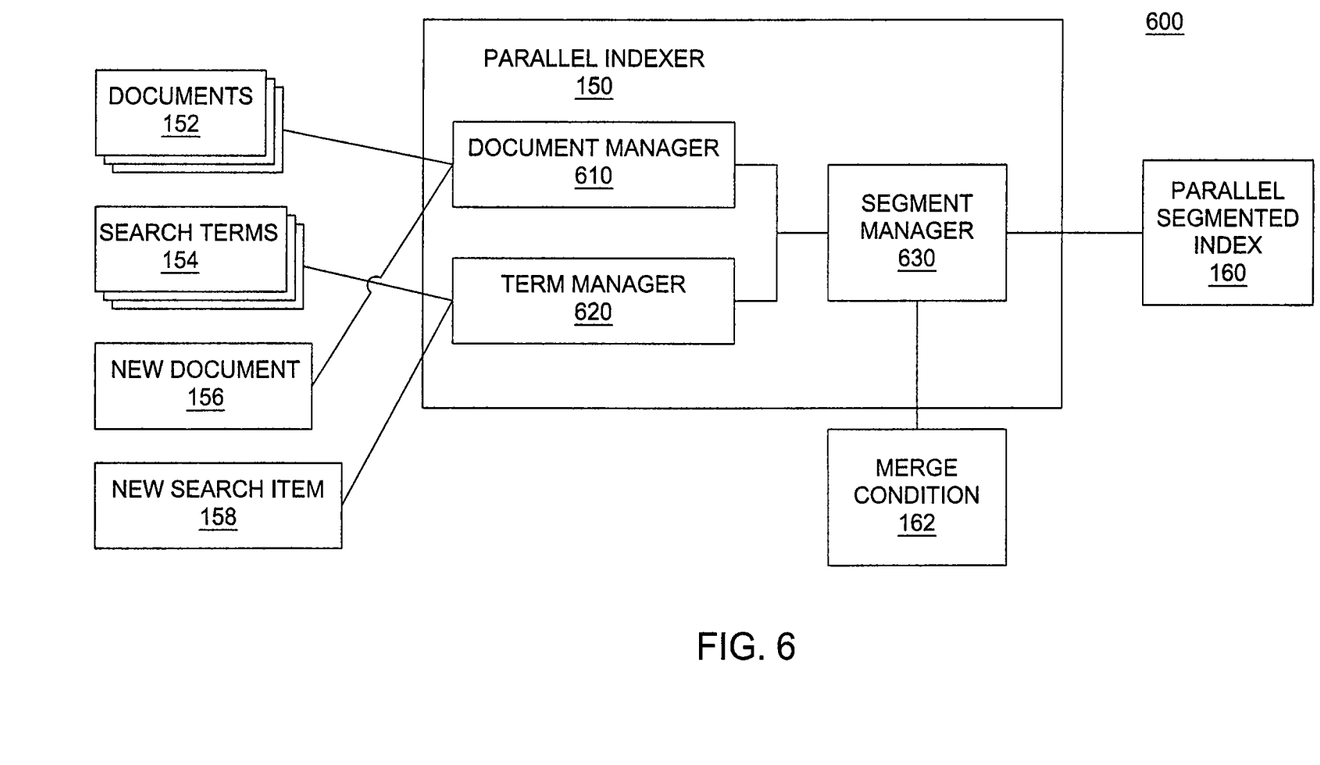
FIG. 6 is a block diagram illustrating components of a parallel indexer, according to one embodiment of the invention.

FIG. 6 is a block diagram 600 illustrating components of the parallel indexer 150 of FIG. 1, according to one embodiment of the invention. As shown, the parallel indexer 150 includes a document manager 610, a term manager 620, and a segment manager 630.

In one embodiment, the document manager 610 receives documents 152 for which a parallel segmented index 160 is to be generated. The document manager 610 may also receive a new document 156 to be incrementally indexed by the generated index 160. Similarly, the term manager 620 receives search terms 154 for which the parallel segmented index 160 is to be generated. The term manager 620 may also receive a new search term 158 to be incrementally indexed by the generated index 160.

In one embodiment, the segment manager 630 may partition the index 160: (i) in a first dimension by documents 152 to create one or more master segments and (ii) in a second dimension by terms 154 to create one or more slave segments. The segment manager 630 may configure, based on user input, policies for merging segments and for creating new segments. For example, a user may specify a condition for merging segments (e.g., four segments, each containing N documents, are to be merged). Upon determining that the condition is met, the segment manager 630 may merge segments of the index 160. Further, the segment manager 630 may generate slave segments and merged segments that partition documents and reference document identifiers in a manner consistent with the master segments of the index 160.

Of course, the embodiments described herein are intended to be illustrative and not limiting of the invention, and other embodiments are broadly contemplated. Those skilled in the art will recognize, for example, that embodiments of the invention may be adapted to support other documents, search terms, merge operations, policies for creating a new segment, and policies for merging segments.

Advantageously, embodiments of the invention generate an index that supports both incremental document indexing and incremental term indexing. In one embodiment, a parallel indexer may receive documents and search terms for which to create an index. From the documents and search terms, the parallel indexer may create an index partitioned in a first dimension by documents (to create one or more master segments) and in a second dimension by search terms (to create one or more slave segments). The parallel indexer may receive a request to incrementally index a new document or a new search term. Responsive to the request, the parallel indexer may index the new document or new search term, without having to modify the entire index. Because the entire index need not be modified (e.g., need not be loaded into memory), new documents and new search terms may be indexed efficiently. Further, policies for creating new segments and for merging segments may be specified by a user. Further still, any generated slave segments and/or merged segments may partition documents and reference document identifiers in a manner consistent with the master segments of the index.

While the foregoing is directed to embodiments of the present invention, other and further embodiments of the invention may be devised without departing from the basic scope thereof, and the scope thereof is determined by the claims that follow.

What is claimed is:

1. A computer-implemented method to facilitate incremental document indexing and incremental term indexing, the computer-implemented method comprising:
 receiving an index to a plurality of documents and with respect to a plurality of terms, wherein the index is partitioned in: (i) a first dimension by documents and into a plurality of document segments, and (ii) a second dimension by terms and into a plurality of term segments;

upon receiving a first term not part of the plurality of terms, generating, by operation of one or more computer processors, a new term segment separate from the plurality of term segments and indexing the plurality of documents with respect to at least the first term;

expanding the index in the second dimension to include the new term segment without modifying any of the plurality of document segments or the plurality of term segments and without expanding the index in the first dimension to include any new document segment;

upon receiving a first document not part of the plurality of documents, generating a new document segment separate from the plurality of document segments and indexing at least the first document with respect to the plurality of terms and the first term; and expanding the index in the first dimension to include the new document segment without modifying any of the plurality of document segments or the plurality of term segments and without expanding the index in the second dimension to include any new term segment.

2. The computer-implemented method of claim 1, wherein the first term is added to the new term segment only upon determining that the new term segment does not exceed a maximum threshold size, wherein the computer-implemented method further comprises:

upon determining that the new term segment exceeds the maximum threshold size, generating a second new term segment storing an index to the plurality of documents with respect to a second term, wherein the index is expanded in the second dimension to include the second new term segment.

3. The computer-implemented method of claim 1, further comprising:

receiving a request to update the index to include a new document; and adding a new document to the index by modifying at least one of the plurality of document segments.

4. The computer-implemented method of claim 1, further comprising:

merging at least two of the plurality of document segments to generate a merged document segment; and merging at least two of the plurality of term segments to generate a merged term segment, wherein one or more document identifiers are consistently renumbered across all segments.

5. The computer-implemented method of claim 1, wherein the new term segment is modified to include the first term.

6. The computer-implemented method of claim 1, further comprising:

receiving a query on a segment selected from the plurality of document segments and the plurality of term segments;

executing the query against the selected segment to generate a result; and generating a result segment, separate from the selected segment, to store the generated results.

7. The computer-implemented method of claim 1, wherein only a lower cost of incrementally expanding the index in the first and second dimensions is incurred in lieu of a higher cost of modifying the plurality of document segments or the plurality of term segments.

8. The computer-implemented method of claim 7, wherein the first term is added to the new term segment only upon determining that the new term segment does not exceed a maximum threshold size, wherein the computer-implemented method further comprises:

upon determining that the new term segment exceeds the maximum threshold size, generating a second new term segment storing an index to the plurality of documents with respect to a second term, wherein the index is expanded in the second dimension to include the second new term segment.

9. The computer-implemented method of claim 8, further comprising:

merging at least two of the plurality of document segments to generate a merged document segment; and merging at least two of the plurality of term segments to generate a merged term segment, wherein one or more document identifiers are consistently renumbered across all segments.

10. The computer-implemented method of claim 9, wherein the index comprises a parallel segmented index, wherein the computer-implemented method is performed by a parallel indexer application, wherein the parallel indexer application comprises a plurality of components including:

a document manager component configured to receive documents to incrementally index;

a term manager component configured to receive terms to incrementally index; and a segment manager component configured to: (i) partition the index in the first and second dimensions in order to generate the parallel segmented index and (ii) configure, based on user input, policies for merging segments and for creating new segments, respectively;

wherein the computer-implemented method further comprises:

receiving a query on a segment selected from the plurality of document segments and the plurality of term segments;

executing the query against the selected segment to generate a result; and generating a result segment, separate from the selected segment, to store the generated results.

11. The computer-implemented method of claim 1, wherein the index comprises a parallel segmented index.

12. A computer program product to facilitate incremental document indexing and incremental term indexing, the computer program product comprising a hardware computer-readable memory having computer-usable program code executable by one or more computer processors to:

receive an index to a plurality of documents and with respect to a plurality of terms, wherein the index is partitioned in: (i) a first dimension by documents and into a plurality of document segments, and (ii) a second dimension by terms and into a plurality of term segments;

upon receiving a first term not part of the plurality of terms, generate, by operation of the one or more computer processors when executing the computer usable program code, a new term segment separate from the plurality of term segments and indexing the plurality of documents with respect to at least the first term;

expand the index in the second dimension to include the new term segment without modifying any of the plurality of document segments or the plurality of term segments and without expanding the index in the first dimension to include any new document segment;

upon receiving a first document not part of the plurality of documents, generate a new document segment separate from the plurality of document segments and indexing at least the first document with respect to the plurality of terms and the first term; and expand the index in the first dimension to include the new document segment without modifying any of the plurality of document segments or the plurality of term segments and without expanding the index in the second dimension to include any new term segment.

13. The computer program product of claim 12, wherein the first term is added to the new term segment only upon determining that the new term segment does not exceed a maximum threshold size, and wherein the computer-usable program code is further executable to:

upon determining that the new term segment exceeds the maximum threshold Size, generate a second new term segment storing an index to the plurality of documents with respect to a second term, wherein the index is expanded in the second dimension to include the second new term segment.

14. The computer program product of claim 12, wherein the computer-usable program code is further executable to:

receive a request to update the index to include a new document; and add a new document to the index by modifying at least one of the plurality of document segments.

15. The computer program product of claim 12, wherein the computer-usable program code is further executable to:

merge at least two of the plurality of document segments to generate a merged document segment; and merge at least two of the plurality of term segments to generate a merged term segment, wherein one or more document identifiers are consistently renumbered across all segments.

16. The computer program product of claim 12, wherein the new term segment is modified to include the first term.

17. The computer program product of claim 12, wherein the computer-usable program code is further executable to:

receive a query on a segment selected from the plurality of document segments and the plurality of term segments;

execute the query against the selected segment to generate a result; and generate a result segment, separate from the selected segment, to store the generated results.

18. A system to facilitate incremental document indexing and incremental term indexing, the system comprising:

a computer processor; and a memory containing an application program which, when executed on the computer processor, is configured to perform an operation comprising:

receiving an index to a plurality of documents and with respect to a plurality of terms, wherein the index is partitioned in: (i) a first dimension by documents and into a plurality of document segments, and (ii) a second dimension by terms and into a plurality of term segments;

upon receiving a first term not part of the plurality of terms, generating a new term segment separate from the plurality of term segments and indexing the plurality of documents with respect to at least the first term;

expanding the index in the second dimension to include the new term segment without modifying any of the plurality of document segments or the plurality of term segments and without expanding the index in the first dimension to include any new document segment;

upon receiving a first document not part of the plurality of documents, generating a new document segment separate from the plurality of document segments and indexing at least the first document with respect to the plurality of terms and the first term; and expanding the index in the first dimension to include the new document segment without modifying any of the plurality of document segments or the plurality of term segments and without expanding the index in the second dimension to include any new term segment.

19. The system of claim 18, wherein the first term is added to the new term segment only upon determining that the new term segment does not exceed a maximum threshold size, wherein the operation further comprises:

upon determining that the new term segment exceeds the maximum threshold size, generating a second new term segment storing an index to the plurality of documents with respect to a second term, wherein the index is expanded in the second dimension to include the second new term segment.

20. The system of claim 18, wherein the operation further comprises:

receiving a request to update the index to include a new document; and adding a new document to the index by modifying at least one of the plurality of document segments.

21. The system of claim 18, wherein the operation further comprises:

merging at least two of the plurality of document segments to generate a merged document segment; and merging at least two of the plurality of term segments to generate a merged term segment, wherein one or more document identifiers are consistently renumbered across all segments.

22. The system of claim 18, wherein the new term segment is modified to include the first term.

23. The system of claim 18, wherein the operation further comprises:

receiving a query on a segment selected from the plurality of document segments and the plurality of term segments;

executing the query against the selected segment to generate a result; and generating a result segment, separate from the selected segment, to store the generated results.

24. The system of claim 18, wherein the index comprises a parallel segmented index.

* * * * *